United States Patent [19] [11] Patent Number: 4,491,160
Axthammer et al. [45] Date of Patent: Jan. 1, 1985

[54] PRESSURIZED FLUID DEVICE

[75] Inventors: Ludwig Axthammer, Hambach; Felix Wössner, Schweinfurt, both of Fed. Rep. of Germany

[73] Assignee: Fichtel & Sachs AG, Schweinfurt, Fed. Rep. of Germany

[21] Appl. No.: 380,933

[22] Filed: May 21, 1982

[30] Foreign Application Priority Data

Jun. 6, 1981 [DE] Fed. Rep. of Germany ....... 3122626

[51] Int. Cl.$^3$ ............................................. F16F 9/06
[52] U.S. Cl. .................. 141/349; 267/64.28; 277/3
[58] Field of Search ............. 141/3, 4, 20, 98, 197, 141/250, 311 R, 349, 350; 188/322.17, 322.21; 367/64.28; 277/3

[56] References Cited
U.S. PATENT DOCUMENTS

| Re. 28,329 | 2/1975 | Nicholls | 188/322.16 X |
| 2,778,390 | 1/1957 | Young, Jr. | 141/392 X |
| 3,139,159 | 6/1964 | Lob | 141/392 X |
| 3,160,182 | 12/1964 | O'Donnell | 141/20 |
| 3,273,607 | 9/1966 | O'Neill, Jr. | 141/353 X |
| 3,277,674 | 10/1966 | Klein et al. | 141/349 X |
| 3,804,217 | 4/1974 | Keijzer et al. | 188/322.17 |
| 4,044,866 | 8/1977 | Ishida | 188/322.21 |
| 4,082,255 | 4/1978 | Masclet et al. | 267/64.28 |
| 4,291,788 | 9/1981 | Kato | 188/322.17 |
| 4,335,871 | 6/1982 | Mölders | 267/64.28 |

FOREIGN PATENT DOCUMENTS

| 1925963 | 12/1969 | Fed. Rep. of Germany. |
| 3042076 | 5/1981 | Fed. Rep. of Germany. |
| 56-46135 | 4/1981 | Japan | 188/322.21 |
| 1503933 | 3/1978 | United Kingdom. |
| 2049099 | 12/1980 | United Kingdom | 267/64.28 |
| 2065266 | 6/1981 | United Kingdom. |

Primary Examiner—Stephen Marcus
Assistant Examiner—Mark Thronson
Attorney, Agent, or Firm—Toren, McGeady and Stanger

[57] ABSTRACT

In a pressurized fluid device a cavity is defined within a container. A piston rod passes through a piston rod guide and seal unit of the container. The piston rod guide and seal unit has an axially inner and an axially outer sealing element sealingly engaging the piston rod. The axially inner sealing element acts as a check valve permitting flow of fluid towards the cavity and preventing flow of fluid out of the cavity. An intermediate chamber is defined between the axially inner and the axially outer sealing element around the piston rod. A filling passage is provided across the piston rod guide and sealing unit. This filling passage includes an axially outer filling passage section across the axially outer sealing element between the intermediate chamber and the exterior of the pressurized fluid device.

22 Claims, 7 Drawing Figures

PRESSURIZED FLUID DEVICE

SUMMARY OF THE INVENTION

The present invention is directed to a pressurized fluid device, particularly to an oscillation damper, a spring strut of a vehicle or a gas spring. The pressurized fluid device comprises a container defining a cavity to be filled with pressurized fluid. The cavity may be completely filled with pressurized gas. Alternatively, the cavity may be partially filled with a liquid and partially with a pressurized gas. A piston rod having an axis passes through at least one piston rod guide and seal unit of the container and is axially movable with respect to the container between an innermost position and an outermost position. A filling passage extends across the piston rod guide and sealing unit in at least one axial position of the piston rod.

A pressurized fluid device of this type is known from German Offenlegungsschrift No. 1 925 963. In this known construction the piston rod comprises an axial section of reduced diameter. When the pressurized fluid device is assembled this section of reduced diameter is positioned such as to coincide with a sealing member of the guide and seal unit, so as to define a channel for the introduction of pressurized gas into the cavity of the container. It is a disadvantage of this known construction that a loss of pressure within the cavity occurs, if during operation the section of reduced diameter coincides with the sealing ring. For preventing such unintended coincidence a terminal part is mounted onto the outer end of the piston rod. This terminal member abuts the container and/or the piston rod seal and guide unit when the piston rod is moved inward beyond a predetermined position so that the axial section of reduced diameter of said piston rod can not enter into coincidence with said sealing ring. In this known construction the container must be longer in axial direction of the piston rod as compared with the length of the container which is necessary in view of the intended range of axial movement of the piston rod.

It is further known in the construction of vibration dampers to provide a bore in the container through which bore the pressurized fluid can be introduced. This bore is closed after the pressurized fluid has been introduced by introducing a ball-shaped closure member into the bore or by a welding operation. With this known manufacturing method one must take care after termination of the filling step to prevent an escape of the pressurized fluid. One must either provide specific components for preventing such escape of pressurized fluid or one must use specific manufacturing steps. In any case it is difficult to refill the device if, for example, the desired presssure value has not been obtained.

It is a primary object of the present invention to avoid the disadvantages experienced in the past and to obtain a pressurized fluid device which can be easily filled and—if necessary—refilled.

A further object of this invention is to prevent pressurized fluid from escaping from the cavity after the cavity has been filled.

Still a further object of this invention is to obtain a pressurized fluid device, in which the cavity is hermeticly closed after the filling operation without relative movement of the piston rod with respect to the container such as to obtain a maximum possible stroke of the piston rod with respect to the container at a minimum total length of the container in axial direction of the piston rod.

In accordance with the present invention the piston rod guide and sealing unit comprises an axially inner and an axially outer sealing element sealing engaging the piston rod. The axially inner sealing element acts as a check valve permitting flow of fluid towards the cavity and preventing flow of fluid out of the cavity. An intermediate chamber is defined between the sealing elements around the piston rod. Such a type of piston rod guide and sealing unit is known for example from U.S. Pat. No. 4,270,635. There is, however, no hint in this known piston rod guide and seal unit to fill the cavity of the container through the piston rod guide and sealing unit.

In accordance with the present invention the filling passage for filling the cavity comprises an axially outer filling passage section across the axially outer sealing element between the intermediate chamber and the exterior of the pressurized fluid device.

In accordance with the present invention the axially outer sealing element can not prevent the introduction of a pressurized fluid into the cavity due to the presence of the axially outer filling passage section on the one hand. On the other hand the axially inner sealing element acting as a check valve prevents the pressurized fluid from escaping out of the cavity after the filling operation has been terminated.

Therefore, after the filling operation has been terminated no specific measures are to be taken for preventing escape of pressurized fluid. The mechanical construction of the pressurized fluid device is, therefore, very simple and economic and also simple and economic filling methods are applicable. When no measures are to be taken for closing the filling passage the possibility is maintained of refilling the cavity with pressurized fluid if for example the first filling step was insufficient in view of obtaining the desired pressure value within the cavity or if after a long time of operation the pressure within the cavity has decreased as a consequence of escape of pressurized fluid.

As liquid filling medium can be introduced within the cavity without difficulties before or during assembling the advantages of this invention particularly apply to the filling of pressurized gas into the cavity. It is, however, well possible that also a liquid filling medium can be introduced into the cavity across the piston rod guide and seal unit when constructed in accordance with the invention.

The axially inner sealing element can fulfill the additional function of stripping dust from the circumferential surface of the piston rod so as to prevent the entrance of dust into the guide and seal unit and into the cavity.

Still a further object of this invention is to provide filling equipment for filling a pressurized fluid device according to this invention. In view of this further object the filling equipment may comprise a filling head adapted for sealing engagement with one of said container and said guide and seal unit. The filling head—when being held in such sealing engagement—defines a filling chamber adjacent the guide and seal unit and surrounding the piston rod. The filling chamber is connected to a source of pressurized fluid. The axially outer filling passage section connects the filling chamber with the intermediate chamber. Such a filling equipment is very simple in design. Moreover, the filling equipment can comprise a source of pressurized fluid consisting of a pumping cylinder and a pumping piston. Such a source of pressurized fluid can be driven by hand and as such independent of mechanically driven sources. The pressure within the cavity can be easily adjusted to a desired value, particularly if the volume of the intermediate chamber and the pumping cylinder is small as compared with the volume of the cavity.

DETAILED DESCRIPTION OF THE INVENTION

Since the construction of vibration dampers, combined shock-absorber-spring units and gas springs is well known in the art, the basic construction and the manner of operation of such units will not be discussed in greater detail in the following description. For the more detailed explanation of the object of the invention a double-tube vibration damper was selected.

Figure 1:
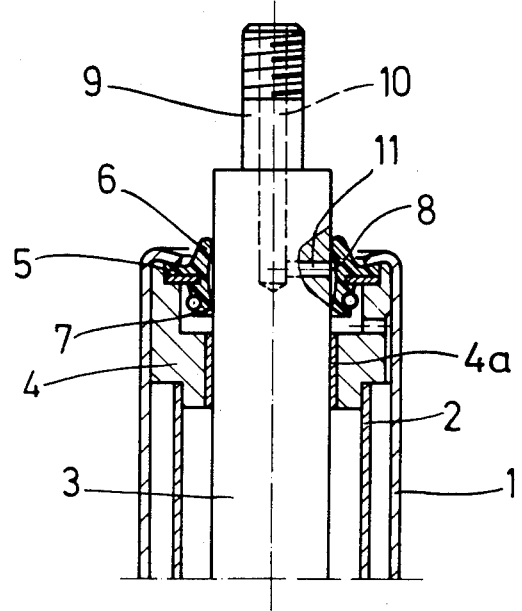
FIGS. 1 to 4 show the guide and seal unit of a double-tube vibration damper in longitudinal section with various embodiments of a filling passage.

The longitudinal section of the double-tube vibration damper according to FIG. 1 shows a piston rod guide member 4 at one axial end of the damper comprising an inner cylinder 2 and an outer container tube 1. The piston rod 3, which carries a piston (not shown) provided with damping passages, is guided centrally in relation to the cylinder 2 by a sliding sleeve 4a of the piston rod guide 4 and possesses at its outer end 9 a longitudinal bore 10, into which a transverse bore 11 opens. The interior of the container tube 1 and of the cylinder 2 is sealed off to the exterior by a piston rod seal unit 5 mounted within the guide member 4. The guide member 4 and the seal unit 5 are fixed to the container tube 1 by crimping over of the container tube 1. This piston rod seal unit 5 is formed as a double seal comprising a first seal 6 acting as a dust or dirt seal and a main seal 7 formed as a lip seal serving to seal off the interior of the vibration damper. An annular space 8 is defined between the first seal 6 and the main seal 7 by the seal unit 5 and by the outer surface of the piston rod 3. When the piston rod 3 is in its innermost position defined by the lower end of the piston rod 3 abutting the lower end of the cylinder 2 (not shown) the filling passage consisting of the longitudinal bore 10 and the transverse bore 11, arranged at the piston rod end 9, opens into the annular space 8 and thus bridges over the first seal 6. Since in the assembling of the vibration damper the damping liquid is ordinarily already introduced before the piston rod guide is mounted, the gas filling step is to be considered. For this purpose a filling head of bell-shaped construction is applied which is similar to that according to FIG. 5. A volume of pressurized gas is forced by a filling cylinder through the longitudinal bore 10 and the transverse bore 11 into the space 8, such that the main seal 7 formed as a lip seal opens towards the interior of the vibration damper and the gas flows as a result of the filling pressure into the interior of the cylinder 2 and of the container 1. After filling has been effected the filling head is merely removed and then— irrespective of the position of the piston rod—no gas can escape from the interior of the container 1 or container 2 through the main seal 7 acting as a check valve. The seal 7 or axially inner sealing element 7 acts as a check valve permitting flow of pressurized fluid into the cylinder 2 in the axial position of the piston rod 3 as shown in FIG. 1 in response to a filling pressure of an externally applied pressure source being greater than the fluid pressure inside the cylinder 2. The sealing element 7 prevents any fluid flow out of the cylinder 2 when the fluid pressure inside the cylinder is greater than the atmospheric pressure outside the cylinder, that is, exterior of the piston rod seal 5.

Figure 2:
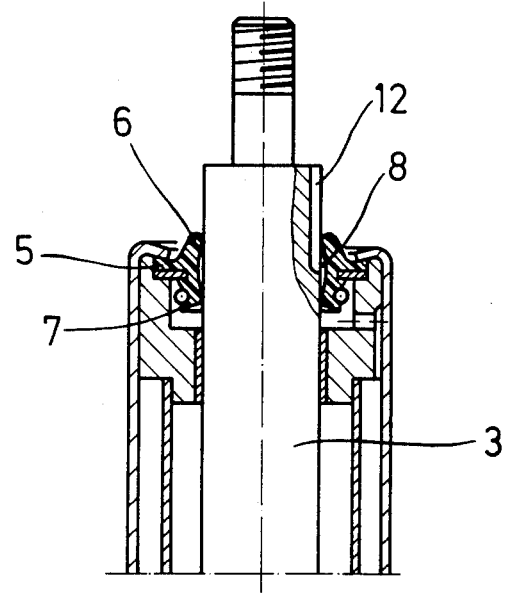

The form of embodiment according to FIG. 2 differs from that according to FIG. 1 essentially in that the piston rod 3 is provided at its upper end with a longitudinal groove 12 which in the most inward position of the piston rod 3 extends down to the space 8 between the first seal 6 and the main seal 7 of the piston rod seal 5.

Figure 3:
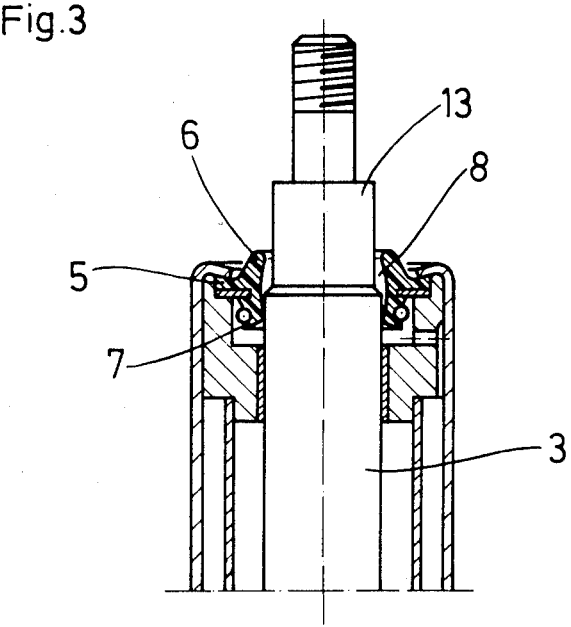

In the form of embodiment according to FIG. 3 the piston rod 3 is provided at its upper end with an extension 13 which has a smaller diameter than the piston rod 3 and the axial length of which is dimensioned so that when the piston rod 3 is in its most inward position this stepped portion 13 terminates in the space 8 between the first seal 6 and the main seal 7 of the piston rod seal unit 5 such as to define an annular filling passage between the extension 13 and the first seal 6.

Figure 4:
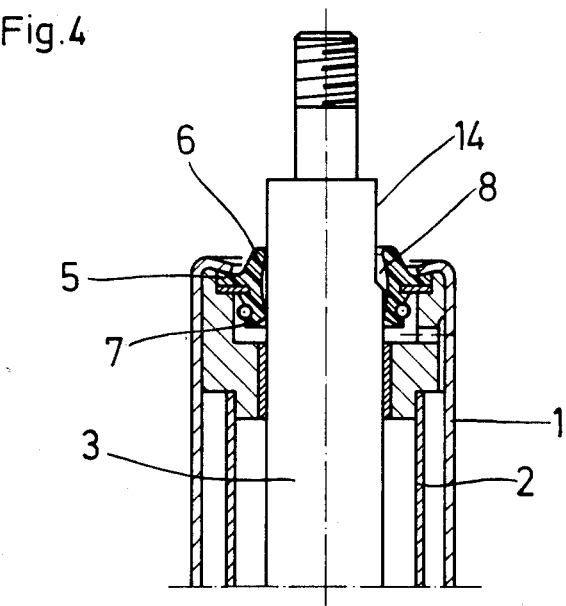

FIG. 4 shows a further form of embodiment where the piston rod 3 has at its upper end a flat face 14 extending parallel with the piston rod axis and terminating in the region of the space 8 when the piston rod 3 is in its innermost position. Between the first seal 6 and the flat face 14 thus a passage is formed while the main seal 7 does not co-operate with the flat face 14 in any position of the piston rod 3.

Figure 5:
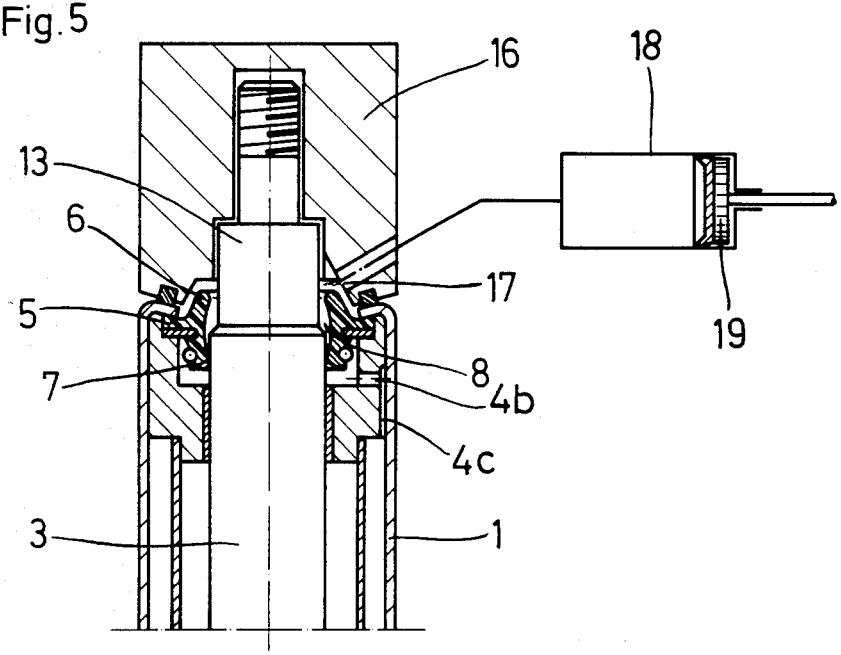
FIG. 5 shows the device of FIG. 3 in engagement with a filling head.

In FIG. 5, the filling head 16, adapted to the form of embodiment of the filling passage according to FIG. 3, is engaged with the upper end of the vibration damper. This filling head 16 forces the piston rod 3 into its innermost position and sealingly engages the crimped-over end of the container 1. The gas volume determined by the filling cylinder 18 is pressed with the aid of the filling piston 19 into the interior 17 of the filling head 16 and passes by way of the passage formed by the extension 13 and the first seal 6 into the space 8. As a result of the filling pressure the main seal 7 of the piston rod seal unit 5 is lifted away from the piston rod surface and the gas passes into the interior of the container through channels 4b, 4c.

Figure 6:
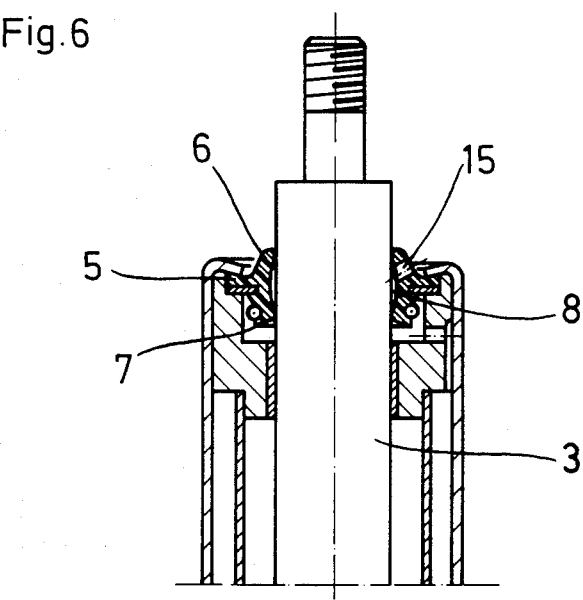
FIG. 6 shows a longitudinal section according to FIG. 1 with a further embodiment of the filling passage.
Figure 7:
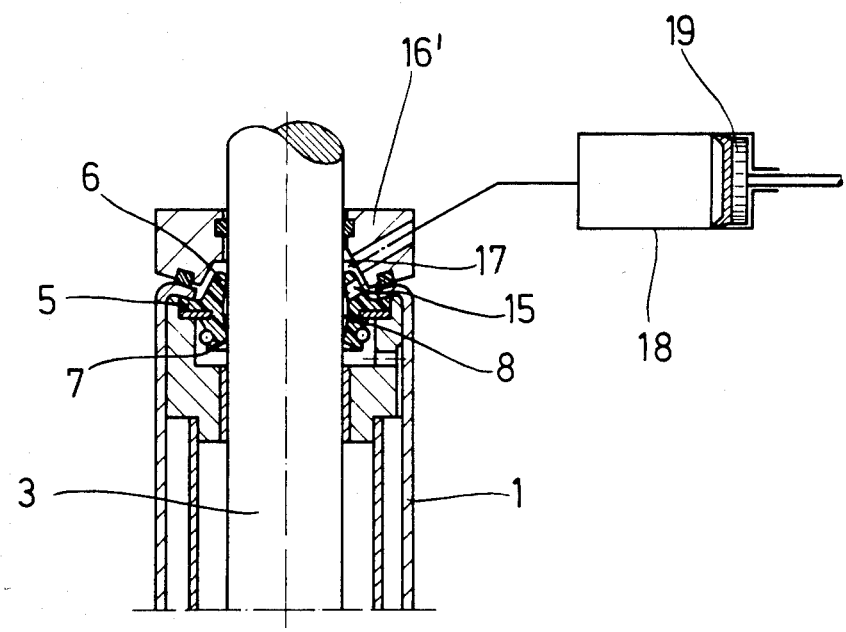
FIG. 7 shows the device of FIG. 6 in engagement with a corresponding filling head.

A further form of embodiment of the filling passage is shown in FIG. 6. Here this filling passage is formed by at least one bore 15 passing through the first seal 6. This bore 15 opens into the space 8. It is here immaterial in which position of the piston rod 3 the filling of the vibration damper takes place. FIG. 7 shows the corresponding device for filling. Here a somewhat modified filling head 16 is provided which is sealed off against the container 1 and the piston rod 3. A predetermined gas volume is fed from the filling cylinder 18 by the filling piston 19 into the small chamber 17 of the filling head 16. Thence the gas passes by way of the bore 15 into the space 8 and the main seal 7 is lifted away from the surface of the piston rod 3 due to pressure difference. Thus gas is forced into the interior of the container 1. In order to prevent dirt from penetrating through the bore 15 into the chamber 8 after the filling operation has taken place, this bore may be closed by suitable closure means. This can be effected for example by a small adhesive piece or an appropriately small stopper. Closing of the bore 15 is carried out only after the functional testing of the unit, that is to say when the required pressure value is reached, in order to render possible any necessary top-up in a simple manner. Of course the unit according to FIG. 6 and 7 can be topped up if pressure is lost, but for this purpose it is necessary to remove the part closing the bore 15.

The piston rod seal unit 5 may be made of any plastic or rubber-like material as is well known in the art of sealing members particularly for use in shock-absorbers, gas springs and the like. As can be seen for example from FIG. 1 the first seal 6 and the main seal 7 are integral.

While specific embodiments of the invention have been shown and described in detail to illustrate the application of the inventive principles, it will be understood that the invention may be embodied otherwise departing from such principles.

What is claimed is:

1. In a pressurized fluid device comprising an axially extending container (1) having at least one open end and defining a cavity to be filled with pressurized fluid;
  a piston rod guide and seal unit (4) located in the at least one open end of said container;
  a piston rod (3) having an axis extending in the axial direction of said container and a circumferential face extending around the axis and passing through said piston rod guide and seal unit of said container and being axially movable with respect to said container between an innermost position and an outermost position;
  a filling passage (10, 11, 8, 7) extending across said piston rod guide and seal unit in at least one axial position of said piston rod; the improvement comprising
  (a) said piston rod guide and seal unit (4) comprising relative to the cavity in said container an axially inner and an axially outer sealing element (7, 6) with each said sealing element engageable with said circumferential face of said piston rod;
  (b) said axially inner sealing element (7) acting as a check valve permitting flow of fluid into said cavity in said at least one axial position of said piston rod (3) in response to a filling pressure of the fluid outside said cavity being greater than the fluid pressure inside said cavity and preventing flow of fluid out of said cavity in said at least one axial position of said piston rod (3) in response to a fluid pressure inside said cavity being greater than atmospheric pressure outside said cavity;
  (c) an intermediate chamber (8) being defined axially between said sealing elements (6, 7) around said piston rod; and
  (d) in the at least one axial position of said piston rod said filling passage comprising an axially outer filling passage section (10, 11) extending across said axially outer sealing element (6) between said intermediate chamber and the exterior of said pressurized fluid device with said outer filling passage section being open at least in said at least on axial position of said piston rod (3).

2. A pressurized fluid device as set forth in claim 1, said axially outer filling passage section (10, 11) extending across said axially outer sealing element (6) between said intermediate chamber (8) and the exterior of said pressurized fluid device, only when said piston rod (3) is in its innermost position.

3. A pressurized fluid device as set forth in claim 1, said axially outer filling passage section comprising a bore system (10, 11) extending within said piston rod through a portion thereof which is axially outside said axially outer sealing element (6) of said piston rod guide and seal unit (4).

4. A pressurized fluid device as set forth in claim 3, wherein said bore system (10, 11) comprises a substantially axially extending bore (10) and a bore extending substantially transverse with respect to said axis.

5. A pressurized fluid device as set forth in claim 1, wherein said axially outer filling passage section comprises a groove (12) extending in substantially axial direction along a circumferential face of said piston rod (3).

6. A pressurized fluid device as set forth in claim 1, wherein said axially outer filling passage section is defined by a section (13) of reduced diameter of said piston rod, said section of reduced diameter axially coinciding with said axially outer sealing element (6), when said piston rod is in said at least one axial position.

7. A pressurized fluid as set forth in claim 6, wherein said section of reduced diameter (13) is an axially outer terminal section of said piston rod (3).

8. A pressurized fluid device as set forth in claim 1, wherein said axially outer filling passage section is defined by a flat surface section (14) of said piston rod (3) substantially parallel to the axis thereof which said surface section (14) axially coincides with said axially outer sealing element, when said piston rod is in said at least one axial position.

9. A pressurized fluid device as set forth in claim 1, wherein said axially outer filling passage section is defined by a channel (15) extending through said axially outer sealing element (6) at a location radially outward from the circumferential surface of said piston rod.

10. A pressurized fluid device as set forth in claim 9, wherein said channel is a (15) bore through said axially outer sealing element (6).

11. A pressurized fluid device as set forth in claim 9, wherein said channel (15) is closable by a closure member.

12. A pressurized fluid device as set forth in claim 1, wherein said axially inner and said axially outer sealing elements (7, 6) define an integral sealing member.

13. A pressurized fluid device as set forth in claim 1, wherein said axially inner sealing element (7) is shaped as a sealing lip having a root portion and a tip portion, said tip portion engaging said piston rod and being located axially inward of said root portion.

14. A pressurized fluid device as set forth in claim 1, wherein said axially outer sealing element is shaped as a sealing lip a root portion and a tip portion, said tip portion engaging said piston rod (3) and being axially outward of said root portion.

15. A pressurized fluid device as set forth in claim 1, wherein said pressurized fluid comprises a pressurized gas.

16. A pressurized fluid device as set forth in claim 1, including a filling head (16) adapted for sealing engagement with one of said container (1) and said guide and seal unit (4), said filling head (16)—when being held in such sealing engagement—defining a filling chamber (17) adjacent said guide and seal unit and surrounding said piston rod, and a source (18, 19) of pressurized fluid connected to said filling chamber, said axially outer filling passage section connecting said filling chamber (17) with said intermediate chamber (8).

17. A pressurized fluid device as set forth in claim 16, wherein said filling heat (16) comprises substantially axially directed abutment means for engagement with axially opposed counter-abutment means of said piston rod (3), said piston rod being in said at least one axial position when said counter-abutment means are in engagement with said abutment means and said filling head (16) is held in said sealing engagement.

18. A pressurized fluid device as set forth in claim 16, wherein said filling chamber (17) has a volume which is substantially smaller than said cavity.

19. A pressured fluid device as set forthin claim 16, wherein said filling head (16) is bell-shaped, so as to receive the axially outer end of said piston rod (3).

20. A pressurized fluid device as set forth in claim 16, wherein said filling head (16') comprises a piston rod passage for said piston rod (3), said piston rod being in sealing engagement with said piston rod passage.

21. A pressurized fluid device as set forth in claim 16, wherein said source of pressurized fluid comprises a pumping cylinder (18), a pumping piston and driving means for transmitting a reciprocating movement to said pumping piston (19) with respect to said pumping cylinder (18).

22. A pressurized fluid device, as set forth in claim 1, wherein said at least one axial position of said piston rod is the innermost position of said piston rod (3).

* * * * *